Figure 7:
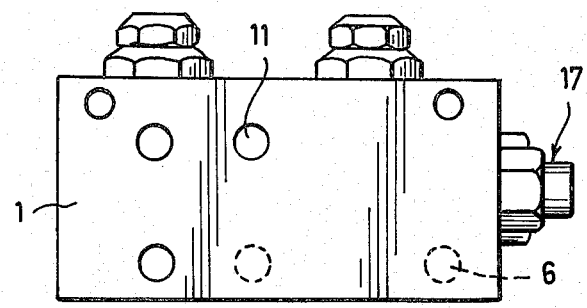

United States Patent [19]

Huhtala

[11] Patent Number: 4,466,293

[45] Date of Patent: Aug. 21, 1984

[54] VOLUME FLOW METER FOR A FLOWING MEDIUM

[75] Inventor: Teuvo T. Huhtala, Muurame, Finland

[73] Assignee: Oy Safematic Ltd., Muurame, Finland

[21] Appl. No.: 398,714

[22] Filed: Jul. 15, 1982

[30] Foreign Application Priority Data

Jul. 20, 1981 [FI] Finland .................................. 812265

[51] Int. Cl.$^3$ ............................................. G01F 1/22
[52] U.S. Cl. .................................................. 73/861.54
[58] Field of Search ........... 73/861.54, 861.53, 861.55, 73/272 R

[56] References Cited

U.S. PATENT DOCUMENTS 2,423,604 7/1947 McCord ........................ 73/272 R X
4,122,863 10/1978 Braukmann .................. 73/861.54 X Primary Examiner—Gerald Goldberg
Assistant Examiner—Brian R. Tumm
Attorney, Agent, or Firm—Cushman, Darby & Cushman

[57] ABSTRACT

A volume flow meter for the measurement of the flow quantity of a liquid, which meter comprises a cylindrical flow channel (3), which has an inlet point (10) and an outlet point (12) for passing the liquid to be measured through the measurement channel. In the measurement channel, there is an axially moving, spring-loaded indicator piston (4), which is shifted by the liquid in the measurement channel into different positions depending on the flow quantities. In the wall of the measurement channel, there is an outflow slot (27) for the liquid, which slot becomes deeper from the inlet point to the outlet point. The meter is provided with a reversing valve (17), so the flow of the liquid to be measured can be guided through the by-passing channel (26) to the opposite side (3') of the indicator piston (4), as seen from the inlet point (10), so as to shift the indicator piston towards the inlet point. This movement of the indicator piston wipes the wall of the measurement channel clean from impurities. In the indicator piston, there is a flow connection from the opposite side of the piston to the outflow slot of the measurement channel.

8 Claims, 10 Drawing Figures

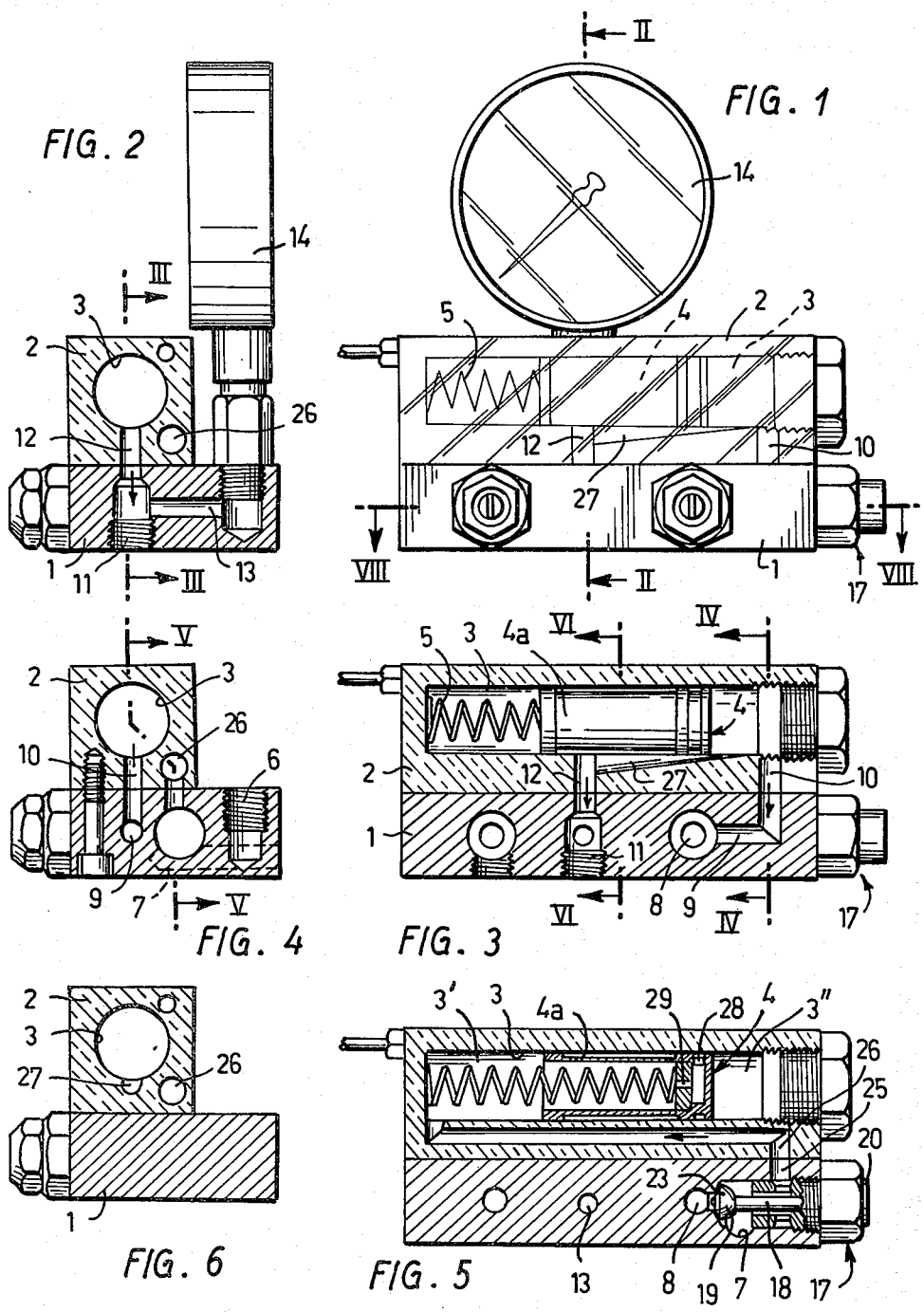

VOLUME FLOW METER FOR A FLOWING MEDIUM

The subject of the present invention is a volume flow meter for the measurement of the flow quantity of a flowing medium, especially of a liquid, which meter comprises a cylindrical flow channel, to which channel are connected an inlet point and an outlet point for passing the medium to be measured through the measurement channel, an indicator piston moving axially in the measurement channel, which piston is shifted by the medium flowing from the inlet channel in the measurement channel into different axial positions depending on the flow quantities, and an axial flow slot placed in the measurement channel, the size of the said slot being affected by the axial position of the indicator piston.

In prior art, similar volume flow meters are known for the measurement of flow quantities of liquids by making use of the interaction between the velocity pressure and the static pressure of the liquid in a measurement channel of varying size. The state of pressure produced in this way guides a piston moving in the measurement channel, the position of the piston in the channel constituting the measure of the volume flow quantity. In some prior-art meter constructions the measurement channel is conically widening and as indicator member is used a ball or any other float, whereby the variation of the size of the flow slot available for the passage of the liquid takes place so that the axially mobile ball or float changes its position to a wider or narrower point in the measurement channel as the flow quantity changes. In other prior-art meter constructions, the measurement channel is cylindrical and as indicator means is used a piston gliding against the inside face of the measurement channel, which piston moves around a stationary conical spindle extending through the piston. In such a case, the change in the size of the flow slot available for the passage of the liquid takes place as the piston changes its position to a thicker or narrower point of the conical spindle as the flow quantity varies.

A drawback of meters of these types is that impurities in the liquid, e.g. humus substances in water, form sediments on the inside face of the measurement channel. This makes the assuming of the right position by the mobile piston more difficult and, also, makes the inside face of the measurement channel dark so that it is difficult to see the position of the piston. In order that it should be possible to avoid disassembling of the meter for cleaning, it is suggested in the Finnish Pat. No. 53,042 that a brush be mounted in the measurement channel which can be moved from the outside and by means of which the inside face of the measurement channel can be cleaned. True enough, the patent relates to a meter with a conically widening measurement channel, but a similar brush cleaning would also be conceivable in a meter with a cylindrical measurement channel and an indicator piston. The use of the brush is, however, relatively slow, for which reason one may neglect to use it. Moreover, the brush shaft projecting from the meter is readily damaged and increases the space requirement of the meter considerably.

The object of the present invention is to provide a volume flow meter which eliminates the problem resulting from contamination and thereby increases the reliability of operation and the dependability of the meters. This objective is achieved by means of a volume flow meter in accordance with the invention, which is characterized by a reversing valve, which guides the medium to be measured optionally to the inlet point of the measurement channel or, via a by-passing channel, to the opposite side of the indicator piston in the measurement channel, as seen from the inlet point, and that the indicator piston has a flow connection from the said side of the measurement channel to the inlet-point side and to the flow slot of the measurement channel.

The invention is based on the idea that the cleaning of the measurement channel is performed by means of the indicator piston itself by making the piston to move by a sudden strike to its initial position and back to its measurement position by momentarily reversing the flow of the liquid by means of a particular reversing valve. This movement of the indicator piston wipes the inside face of the measurement channel clean of impurities. The wiping movement of the indicator piston is started simply by pressing a knob, whereby the liquid to be measured takes care of the moving of the piston. During the wiping stroke of the indicator piston, the flow of the liquid to the outlet point of the meter is not interrupted, which is important, e.g. when the meter is used for controlling the seal liquid of a two-sided slide-ring seal.

Figure 8:
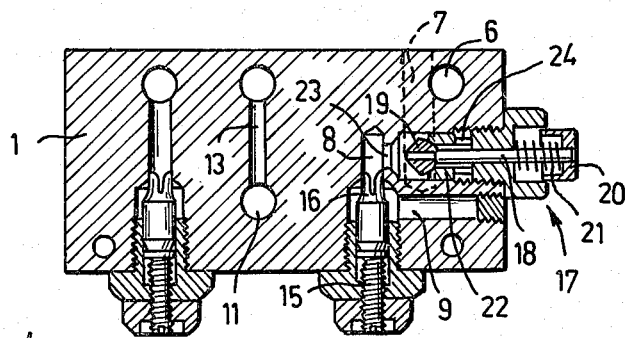
Figure 9:
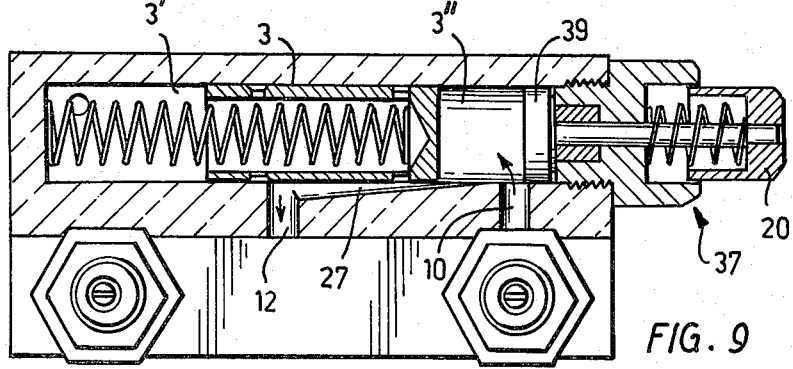
Figure 10:
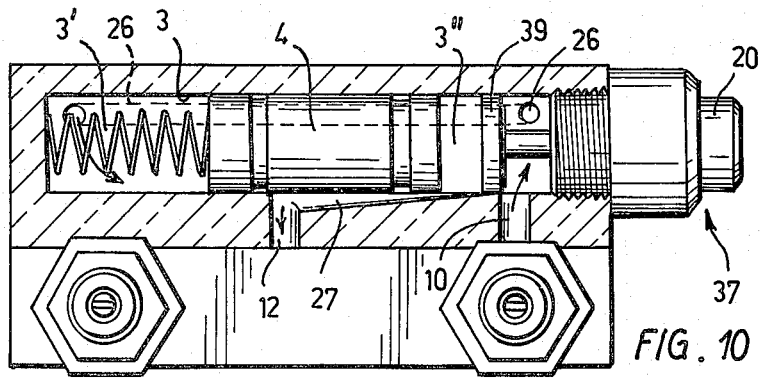

The invention will be described in more detail below with reference to the attached drawings, wherein FIG. 1 shows a preferred embodiment of the flow meter in accordance with the invention as a front view, FIG. 2 shows the meter as a side view as a section along line II—II in FIG. 1, FIG. 3 shows the meter as a front view as a section along line III—III in FIG. 2, FIG. 4 shows the meter as a side view as a section along line IV—IV in FIG. 3, FIG. 5 shows the meter as a front view as a section along line V—V in FIG. 4, FIG. 6 shows the meter as a side view as a section along line VI—VI in FIG. 3, FIG. 7 shows the meter as viewed from the bottom, FIG. 8 shows the meter as viewed from above as a section along line VIII—VIII in FIG. 1, and FIGS. 9 and 10 show an alternative embodiment of the meter as a front view and as a vertical section in the flow-measurement position and in the cleaning position, respectively.

The volume flow meter illustrated in FIGS. 1 to 8 of the drawings consists of an installation part 1 of steel and of a transparent measurement part 2 of plastic, fixed onto the installation part. The measurement part comprises a cylindrical measurement channel 3, which includes an axially moving indicator piston 4, which is pressed by a spring 5 towards the inlet end of the measurement channel.

The installation part 1 has an inlet connection opening 6 for the liquid to be measured, the said inlet opening being connected over channels 7, 8, 9 and 10 to the inlet end of the measurement channel 3. The installation part further includes a outlet connection opening 11, which is connected over channel 12 to the measurement channel and over channel 13 to the pressure meter 14. A choke means 16 adjustable by means of an adjusting screw 15 is mounted in the channel 8, the said means 16 forming a choking point in the channel for the adjustment of the volumetric flow coming into the measurement channel to the desired magnitude in connection with the calibration.

According to the invention, a reversing valve 17 is mounted in the channel 7, FIG. 8, which reversing valve includes an operating spindle 18 moving axially in the valve body, a closing disk 19 being fixed to the inner end of the spindle and a press knob 20 being fixed to the outer end of the spindle. A spring 21 fitted between the press knob and the body pushes the spindle to the measurement position shown in FIG. 8, in which position the closing disk is pressed against the tubular extension 22 of the valve body. When the press knob is in the pressed-in position, the closing disk closes the connection opening 23 between the channels 7 and 8, as is shown in FIG. 5. A bore 24 has been made into the tubular extension 22 to connect the interior space of the extension to the channel 25 made into the installation part, which channel 25 is again connected by means of the channel 26, FIG. 5, to the spring-side end of the measurement channel 3.

In the bottom portion of the cylindrical wall of the measurement channel 3, an inclined bore, i.e. a U-shaped flow slot 27 is formed, which is inclined at an angle of about 5° passing from the inlet end of the measurement channel down to the outlet channel 12. At the closed end of the indicator piston 4 there is a circumferential groove, which is connected by means of a radial opening 28 and an axial center opening 29 to the interior space of the piston and further to the spring-side space 3' of the measurement channel 3. The piston is provided with a sleeve-shaped extension 4a, which covers the portion of the flow slot 27 that at each particular time remains between the closed end of the piston and the outlet opening 12.

The volume flow meter operates as follows:

The liquid to be measured flows into the meter through the inlet opening 6 and via the channels 7, 8, 9 and 10 into the measurement channel 3. The liquid flowing into the measurement channel directs at the indicator piston 4 a force that tends to move the piston against the effect of the spring 5. The position of the indicator piston in the measurement channel depends on variations in the velocity pressure and static pressure of the liquid and constitutes the measure of the volumetric flow quantity of the liquid. The position of the indicator piston can be observed readily from the outside owing to the transparent material of the measurement part. When the volumetric flow increases, the piston moves against the spring as pressed by the liquid. At the same time, a wider outflow opening is opened for the liquid because of the inclined flow slot 27. Thereby part of the velocity pressure of the liquid is converted into static pressure, whereby the piston moves into the position required by the situation and by the flow quantity. On the outside face of the measurement part there is a scale out of which the volumetric flow concerned can be read directly. The openings 28, 29 in the piston balance the liquid pressures in the measurement channel at opposite sides of the piston.

When it is desirable to cleanse the meter, the press knob 20 of the reversing valve 17 is pressed. Then the closing disk 19 closes the connecting opening 23 between the channels 7 and 8 so that the flow of liquid from the inlet opening 6 through the channel 10 into the measurement channel is prevented. However, at the same time a connection is opened from the channel 7 through the tubular extension 22 of the reversing valve and through the bore 24 into the channel 25 and further through the channel 26 into the spring-side space 3' of the measurement space. By the joint force effect of the liquid pressure and the spring 5, the piston moves to its basic position at the inlet channel 10. Owing to its precise gliding fitting, the piston at the same time wipes any slime and impurities possibly adhering to the inside face of the measurement channel off, thereby cleaning the display area of the meter. The liquid flow into the outlet channel 12 of the measurement channel is, however, not interrupted, for the liquid has access through the openings 28 and 29 in the indicator piston 4 into the inlet-side space 3" of the measurement channel and from there further through the flow slot 27 into the outlet channel 12. In the opening 28 a strong pressure loss is produced, whereby the pressure in the space 3' of the measurement channel is higher than in the space 3", so that the piston is instantaneously shifted into its basic position. When the press knob 20 is released, the spring 21 returns the operating spindle to its initial position, whereby the connecting opening 23 is opened and the tubular extension 22 is again closed. Owing to this, the liquid flow is restored through the channels 7, 8, 9 and 10 to the inlet side of the measurement channel, so that the indicator piston again indicates the liquid flow. The cleaning operation can be repeated in this way by pressing the press knob the desired number of times.

It is noticed that the meter can be cleaned in a simple way by means of the indicator piston itself and that the cleaning operation does not interrupt the liquid flow to the outlet connection of the meter. Since the meter has been designed so as to be installed in such a position that the measurement channel is horizontal and the indicator piston operates in the lying position, the weight of the piston itself does not have to be compensated, but the entire pressure energy obtained from the liquid can be charged in the spring 5, whereby the cleaning stroke becomes faster. Detached impurities heavier than the liquid can sink into the outflow opening in the lower part of the measurement channel and be removed through the opening unprevented from the meter without blocking the meter.

The alternative embodiment of volume flow meter illustrated in FIGS. 9 and 10 differs from that illustrated in FIGS. 1 to 8 only in the respect that the reversing valve 17 installed in the liquid inlet channel system 7 to 10 has been substituted for by a reversing valve 37 installed in the measurement channel 3. In this case the arrangement is such that the closing disk 39 of the valve is positioned, in the measurement position shown in FIG. 9, on the right side of the inlet channel 10, where there is a direct connection from the inlet channel to the measurement channel and from there to the outflow slot 27, and, in the cleaning position shown in FIG. 10, on the left side of the inlet channel 10, where the inlet channel is isolated from the measurement channel and from the outflow slot. The channel 26, which passes to the spring-side end of the measurement channel 3, is opened at such a point in the wall of the measurement channel that the inlet opening of the channel is, in the measurement position of the closing disk (FIG. 9), closed by the closing disk but, in the cleaning position of the closing disk (FIG. 10), opened into the space between the closing disk and the body of the reversing valve. Thus, in the cleaning position, the liquid flow can be guided to the opposite side of the indicator piston and the piston be forced to perform the cleaning stroke described above.

The drawings and the related description are only supposed to illustrate the idea of the invention. In its details, the meter in accordance with the invention may show even considerable variation within the scope of the patent claims.

What is claimed is:

1. A volume flow meter for the measurement of the flow quantity of a flowing medium, especially of a liquid, which meter comprises a cylindrical measurement channel, to which channel are connected an inlet point and an outlet point for passing the medium to be measured through the measurement channel, an indicator piston moving axially in the measurement channel, which piston is shifted by the medium flowing from an inlet channel to the measurement channel into different axial positions depending on the flow quantities, and an axial flow slot in communication along its length with the measurement channel, the size of the said slot being affected by the axial position of the indicator piston, characterized by means for cleaning the measurement channel by forcing the indicator piston toward the inlet point, said means including a reversing valve which guides the medium to be measured optionally to the inlet point of the measurement channel or, via a by-passing channel, to the opposite side of the indicator piston in the measurement channel, as seen from the inlet point, and the indicator piston having a flow connection from said opposite side of the measurement channel to the inlet-point side and to the flow slot of the measurement channel.

2. A meter as claimed in claim 1, characterized in that the reversing valve is fitted in the inlet channel leading to the inlet point of the measurement channel and that the by-passing channel runs from the inlet channel by-passing the measurement channel to its opposite side end, as seen from the inlet point.

3. A meter as claimed in claim 2, characterized in that the reversing valve comprises a press-knob-operated, axially moving spindle, which, in the measurement position, closes the connection of the inlet channel to the by-passing channel, and opens the connection of the inlet channel to the inlet point and, in a cleaning position, closes the connection of the inlet channel to the inlet point and opens the connection of the inlet channel to the by-passing channel.

4. A meter as claimed in claim 1, characterized in that the reversing valve is fitted in the end of the measurement channel placed next to the inlet point and that the by-passing channel runs from this end of the measurement channel by-passing the measurement channel to the opposite side of the measurement channel.

5. A meter as claimed in claim 4, characterized in that the reversing valve comprises a press-knob-operated, axially moving spindle, which, in the measurement position, opens the connection of the inlet point to the measurement channel and closes the connection of the measurement channel to the by-passing channel and, in a cleaning position, opens the connection of the measurement channel to the by-passing channel and closes the connection of the inlet point to the measurement channel.

6. A meter as claimed in claim 1, characterized in that the indicator piston is loaded by a spring, which presses the piston towards the inlet point of the measurement channel.

7. A meter as claimed in claim 1, characterized in that the flow slot is formed by at least one groove in the wall face of the measurement channel, which groove passes from the inlet point of the measurement channel to the outlet point and becomes constantly deeper towards the outlet point.

8. A meter as claimed in claim 7, characterized in that the indicator piston is fitted with gliding precision in the measurement channel and that the piston is provided with a sleeve-shaped extension, which, in the various positions of the piston, covers the portion of the flow slot that is placed on the opposite side of the piston, as seen from the inlet point.

* * * * *